Nov. 5, 1963

J. J. JACKSON

3,109,531

GROUPING AND CROWDING MACHINE

Filed Nov. 30, 1959

INVENTOR.
JOSEPH J. JACKSON

BY *Mallinckrodt*
*Mallinckrodt*

ATTORNEYS

Nov. 5, 1963  J. J. JACKSON  3,109,531
GROUPING AND CROWDING MACHINE
Filed Nov. 30, 1959  6 Sheets-Sheet 3

INVENTOR.
JOSEPH J. JACKSON
BY Mallinckrodt and
Mallinckrodt
ATTORNEYS

Nov. 5, 1963 J. J. JACKSON 3,109,531
GROUPING AND CROWDING MACHINE
Filed Nov. 30, 1959 6 Sheets-Sheet 4

INVENTOR.
JOSEPH J. JACKSON

BY Mallinckrodt and Mallinckrodt
ATTORNEYS

United States Patent Office 3,109,531
Patented Nov. 5, 1963

3,109,531
GROUPING AND CROWDING MACHINE
Joseph J. Jackson, 4000 S. 3250 East, Salt Lake City, Utah
Filed Nov. 30, 1959, Ser. No. 856,231
25 Claims. (Cl. 198—34)

This invention relates broadly to machines for crowding together individual articles for various purposes, and is concerned particularly with providing a machine for crowding together, in groups, items baked in multiple, such as so-called "brown and serve" rolls, which are baked to just short of browning in pans having mutually spaced cups and are then packaged for sale.

Heretofore in the packaging of these "brown and serve" rolls, it has been necessary for a girl to pick up the rolls individually from a conveyor belt on which pans containing twenty four rolls are dumped, and to place such rolls, one by one, in the cartons in which they are customarily packed a dozen to a carton. This has involved considerable manual handling of the product.

The invention eliminates such handling and makes it unnecessary for human hands to touch the product. Two people are able to do work formerly done by six. One person delivers to the machine, for dumping, loaded baking pans fresh from the oven, and removes empty pans following the dumping operation, while another person places boxes over compact groups of a dozen rolls each.

A major object of the invention is to provide mechanism for crowding together baked items in groups, for boxing without human handling.

Another object is to provide an integrated machine for cyclically dumping the baked items into the grouping and crowding mechanism directly from baking pans and for carrying the groups of crowded items to a boxing station.

Outstanding features of the invention in the accomplishment of these objects are the provision of a compartmented grouper frame equipped with extendable and retractable pusher elements for each compartment; the utilization of a belt conveyor to constantly provide a receiving and supporting surface below the grouper frame for the baked items dumped from the pans; the provision of mechanism for lowering that portion of the conveyor belt underlying the grouper frame when the grouping and crowding mechanism has completed its operation on any given deposit of baked items, so forward movement of the conveyor will carry the crowded groups away, and for returning that portion of the conveyor belt to its original, raised, item-receiving position; the provision of a pan-receiving rack above the conveyor and at and in advance of the grouping and crowding mechanism, together with pan-dumping mechanism at the discharge end of the rack; and the provision of a drive and timing system which correlates the operations of the conveyor and the several mechanisms.

A specific construction representing what is presently regarded as the best mode of carrying out the invention is illustrated in the accompanying drawings, in which.

Referring to the drawings:

In the specific form illustrated, the machine includes a belt conveyor 20 onto which "brown and serve" rolls 21 are dumped in multiple from successive pans 22 by means of a dumping mechanism 23, such pans being fed to the dumping mechanism by feed mechanism associated with a rack 24 upon which the pans are manually placed by a workman following their removal from an oven in which the rolls are baked to a point just short of browning. The rolls 21 are dumped in mutually spaced formation, as determined by the spacing of the several cups of each pan, onto a receiving portion 25 of the horizontal upper surface of the upper run of conveyor belt 26 and within the confines of a compartmented, contractible, grouper frame 27 constituting roll-confining means, see FIGS. 2 and 6. The conveyor constitutes supporting means for the rolls dumped from the pans.

Endless belt 26 of conveyor 20 is wrapped around a driven pulley 28 and an idler pulley 29, which are so spaced in machine frame 30 as to provide an unobstructed portion 31 of the upper run of such belt for service as a boxing station, where boxes 32 can be placed over respective compact groups 33 of rolls by a worker standing beside the conveyor.

The receiving portion 25 of conveyor belt 26 is normally maintained at roll-clearance level directly beneath grouper frame 27. It is raised during each cycle of machine operation by means of an elevator carriage 34, so that the rolls 21 deposited thereonto are supported at grouping and crowding level within the grouper frame. Elevator carriage 34 is arranged to return to its normal lowered position following the roll-crowding operation, so that belt 26 may be advanced and the compact groups 32 of rolls carried to boxing station 31.

It should be noted that, with each advance of conveyor belt 26, another, sequential part of the horizontal supporting surface of belt 26 is brought directly under grouper frame 27 as a roll-receiving portion 25.

Figures 3, 4, 5:
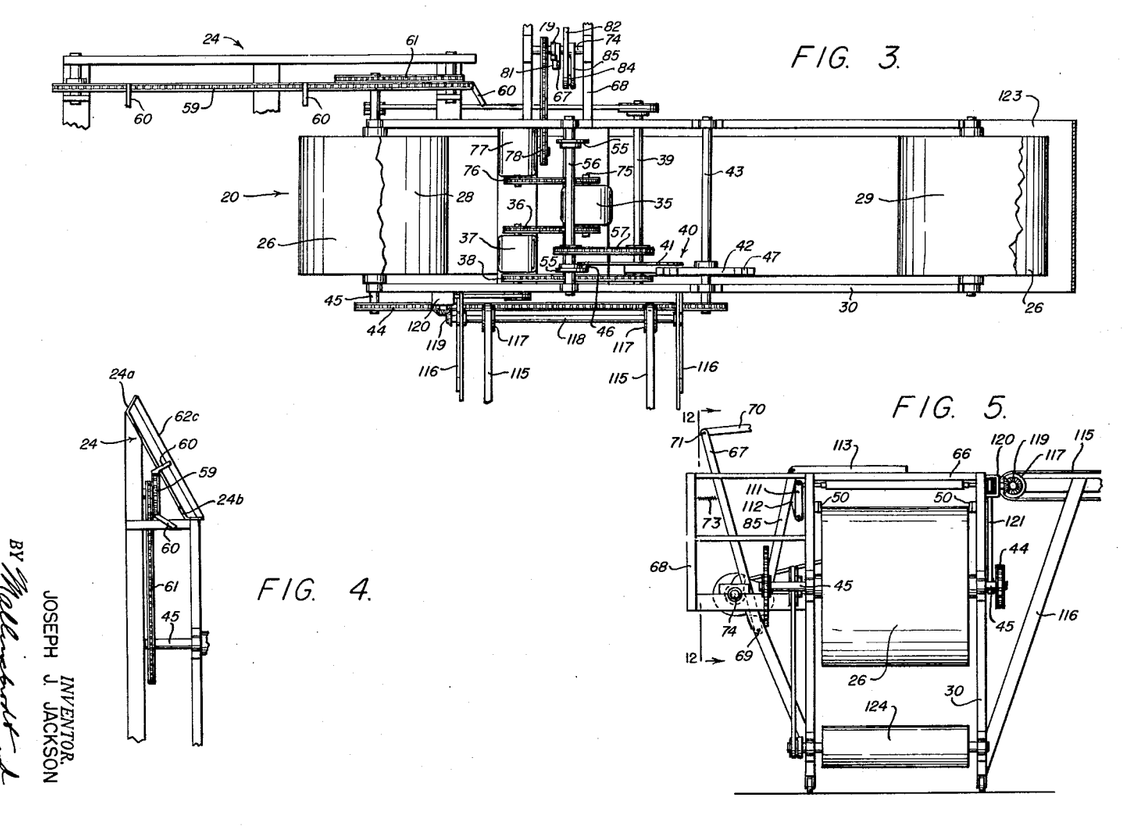
FIG. 3, a top plan including portions broken away in FIG. 2, but the upper run of the belt being broken away for convenience of illustration and the dumping section of the pan rack and the outward extension of the pan-removing conveyor being shown only fragmentarily.
FIG. 4, a fragmentary end elevation taken from the line 4—4 of FIG. 1, to show the pan rack and feed mechanism.
FIG. 5, a fragmentary end elevation taken from the line 5—5 of FIG. 1 and showing that portion of the pan-removing conveyor which is shown in FIG. 3, the machine being in the operating position of FIG. 9.
Figure 6:
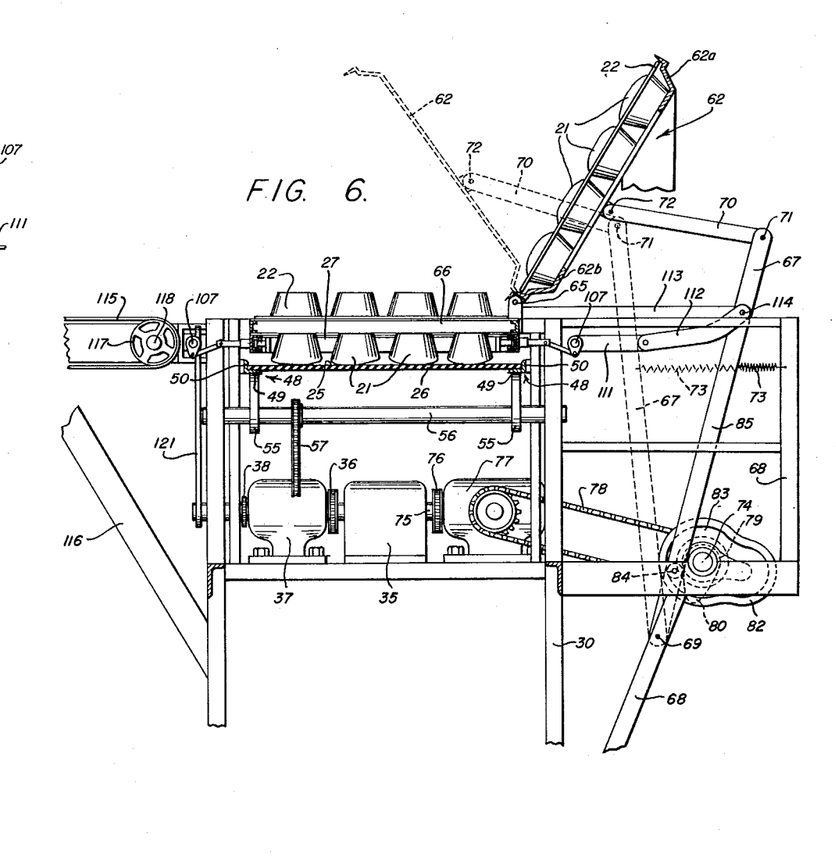
FIG. 6, a fragmentary vertical section taken on the line 6—6 of FIG. 1 and drawn to an enlarged scale, the pan-dumping mechanism being indicated in pan-dumping position by broken lines and a pan of rolls being shown on the reserve section of the rack awaiting movement to the pan-dumping section.

The drive and timing system for controlling the respective operations in predetermined sequence comprises, in this instance, an electric motor 35, FIGS. 3 and 6, serving as a single source of power for driving the several working mechanisms of the machine as well as belt conveyor 20.

A drive train connects motor 35 to driven pulley 28 of the belt conveyor. It includes a chain and sprocket drive set 36 connecting motor 35 in drive relationship with gear box 37, and a second chain and sprocket drive set 38 connecting gear box 37 in drive relationship with a shaft 39 which is rotatably mounted in machine frame 30. The drive train also includes a motion converting mechanism 40, FIG. 1, of "Geneva" movement type for converting continuous rotary motion to intermittent rotary motion, a continuously driven wheel 41 thereof being mounted on the shaft 39 and an intermittently driven, radially slotted plate 42 thereof being mounted on a shaft 43, which, in turn, is rotatably mounted in machine frame 30. A third chain and sprocket drive set 44, FIG. 3, connects shaft 43 in drive relationship with a rotatably mounted shaft 45, upon which driven pulley 28 is fixedly secured.

Figure 1:
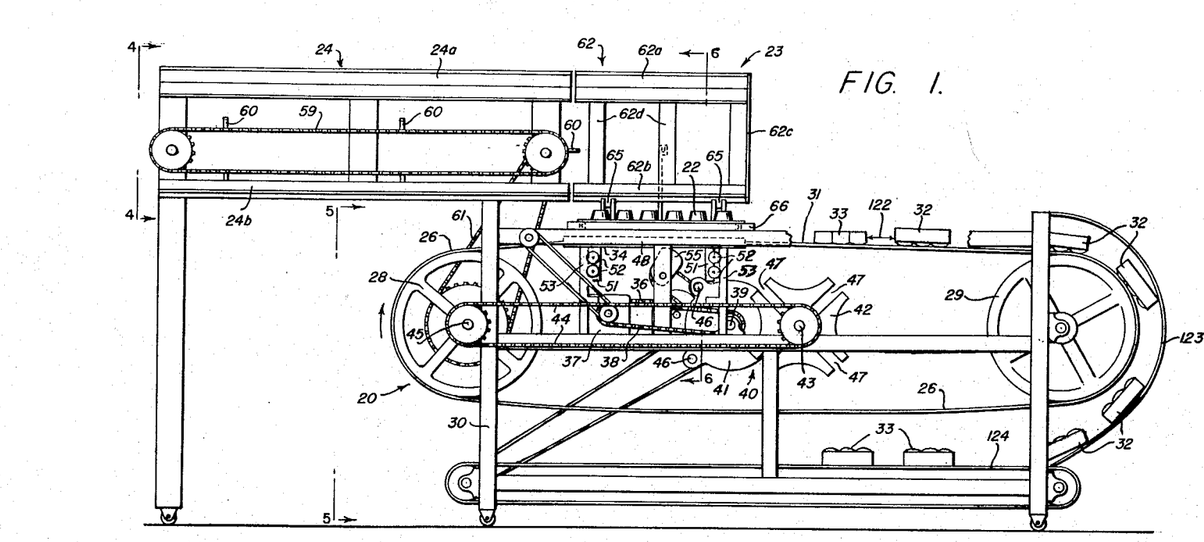
FIG. 1 represents a side elevation of an embodiment of the invention in the form of a machine adapted for the handling of "brown and serve" rolls, the view being taken during operation and immediately following the dumping of a pan of such rolls, other pans waiting to be dumped having been removed from the rack to facilitate illustration of the pan-feeding mechanism, and a pan-removing conveyor in the foreground having been removed for convenience of illustration.

Motion transmitting pins 46, FIG. 1, projecting from wheel 41, progressively engage the radial slots 47 of plate 42 to impart intermittent rotative movement to the latter and to thereby drive belt conveyor 20 forwardly intermittently.

Figure 9:
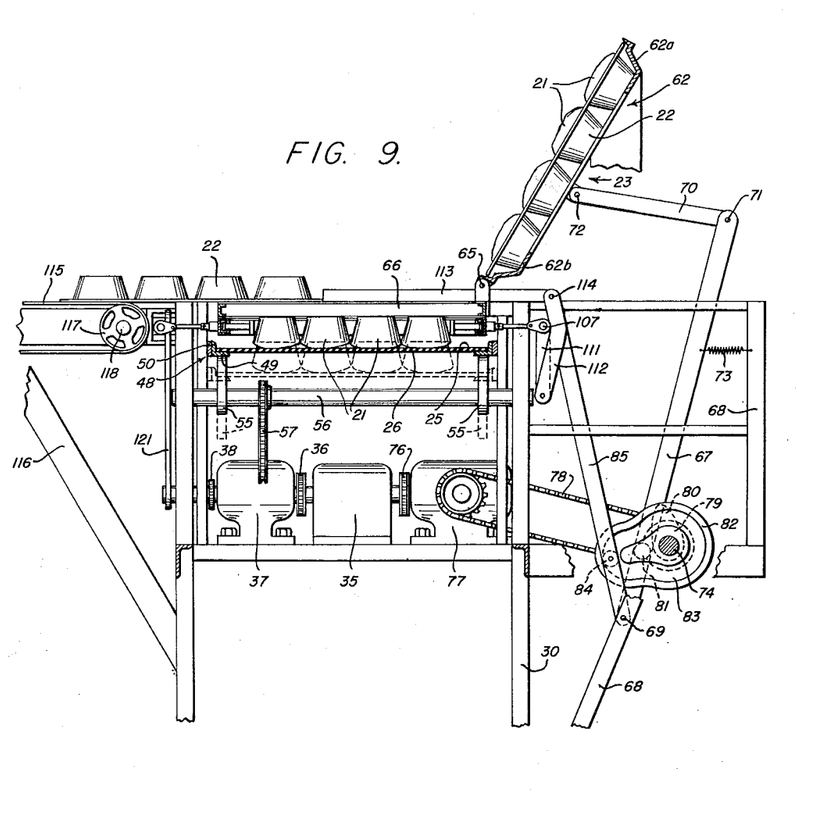
FIG. 9, a view corresponding to that of FIG. 6, but showing the grouping and crowding mechanism in the position of FIG. 8 and the pan ejector mechanism in operating position, the lowered position of the grouped and crowded rolls being shown in broken lines.
Figure 12:
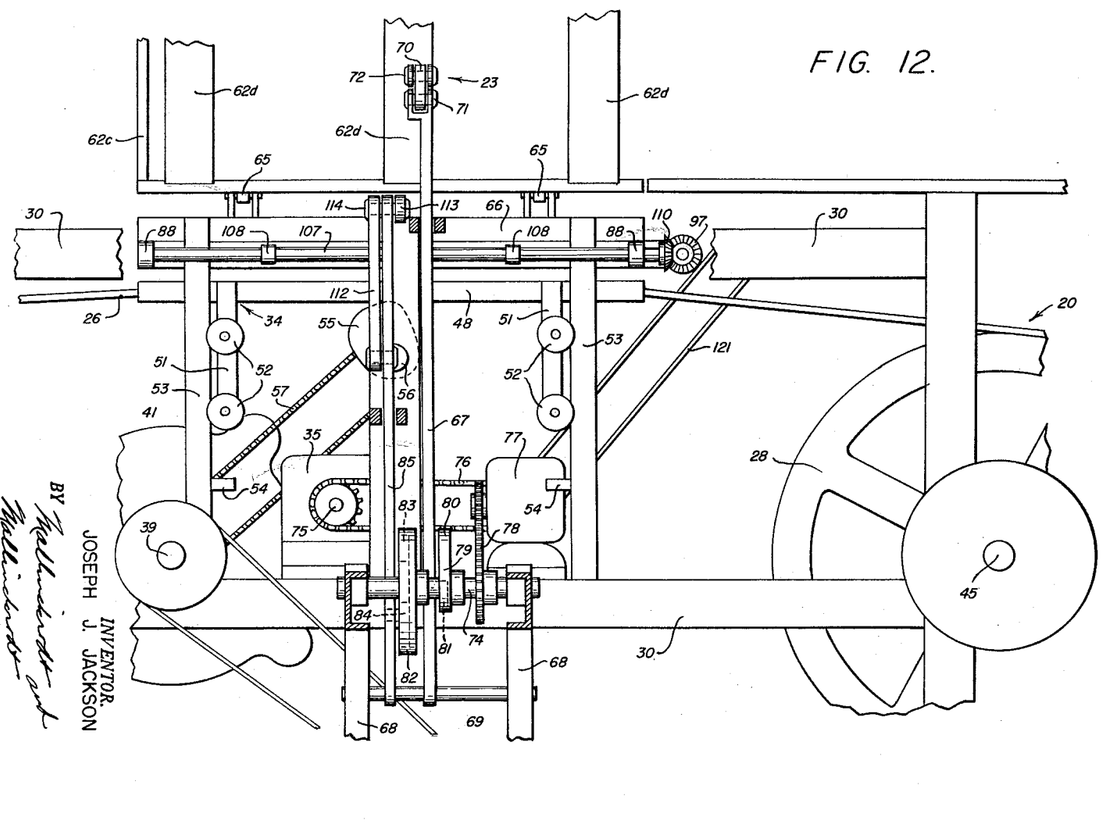
FIG. 12, a fragmentary vertical section taken on the line 12—12 of FIG. 5 and drawn to a greatly enlarged scale.

Elevator carriage 34 comprises two belt-engaging members 48, FIGS. 6, 9, and 12, preferably of structural angle formation, as shown, which extend longitudinally along respective opposite lateral margins of receiving portion 25 of the conveyor belt and serve both to lift and guide the belt, one leg 49 of each angle serving the former purpose and the other leg 50 serving the latter. Each of the members 48 is provided with two depending standards 51 adjacent respective ends thereof. Pairs of flanged wheels 52 are rotatably mounted on the respective legs 51 for guided rolling movement along vertical rails 53, FIG. 12, provided by machine frame 30. Stops 54, projecting from rails 53, limit downward movement of the elevator carriage.

For motivating such elevator carriage 34, paired cams 55, FIGS. 1, 3, and 12, are fixed in mutually similar and spaced relationship on a cam-shaft 56 in supporting engagement with the channels 48, respectively, of the elevator carriage. As the cam shaft rotates these cams alternately raise and lower the carriage and the roll-receiving and supporting portion 25 of conveyor belt 26 which overlies such carriage.

A chain and sprocket drive set 57, FIG. 3, connects shaft 39 in drive relationship with camshaft 56, which is rotatably mounted in frame 30. This camshaft drive, it should be noted, is in phased relation to the drive of wheel 41 and of motion-converting mechanism 40, so as to provide for, one, the raising of elevator carriage 34 and conveyor belt portion 25, two, the holding of them in an elevated position during a predetermined period of time, and, three, the lowering of them—all during the interval of time that belt conveyor 20 is stopped in each cycle of machine operation.

Rack 24, which is conveniently provided as an extension of machine frame 30, holds a series of loaded pans thereon as a reserve supply. Chain and sprocket pan-feeding mechanism 59, FIGS. 1 and 4, is mounted on rack 24 for automatically passing such loaded pans 22 from the reserve supply thereof to pan-dumping mechanism 23 as required. For this purpose, pan-engaging lugs 60 are secured to and project from the chain of mechanism 59 at regular intervals.

A chain and sprocket drive set 61, FIG. 3, connects shaft 45 with the pan-feeding mechanism 59 to actuate it in synchronism with other parts of the machine, so that pans 22 will be fed to the pan-dumping mechanism intermittently as and when the latter is in pan-receiving position.

Pan-dumping mechanism 23 includes a pan-receiving rack 62, FIG. 1, which constitutes, in effect, a lateral extension of pan-holding rack 24 and a component section of the overall pan rack. Guide rails 62a and 62b of rack 62 are aligned longitudinally with guide rails 24a and 24b, respectively, of rack 24 when rack 62 is in the retracted, non-dumping position shown by full lines in FIGS. 4, 6, and 9. Lateral member 62c of rack 62 provides a stop for the respective pans as they are shifted laterally from reserve rack 24 by means of the sprocket chain lugs 60, thereby insuring proper dumping position for the successive pans with respect to conveyor belt portion 25 and contractible grouper frame 27. Cross members 62d rigidly tie guide rails 62a and 62b together to form an integrated frame structure.

Pan-dumping rack 62 is hinged at its bottom to machine frame 30, as at 65, FIGS. 1, 6, and 12, so it can be swung down over grouper frame 27 to drop the pan which it holds down in inverted position upon a stationary frame 66 that is affixed to machine frame 30 directly above such grouper frame, thereby loosening the several rolls 21 in and discharging them from the respective cups of the pan. Such rolls 21 fall onto receiving portion 25 of conveyor belt 26 within the confines of grouper frame 27 in the mutually spaced, inverted positions shown in FIGS. 2, 6, and 7.

For pushing pan-dumping rack 62 forwardly from its normal rest position at appropriate time intervals and for returning it following its downward swing, there is provided linkage motivated by a cam and camshaft driven from motor 35.

Such linkage comprises a lever 67, FIGS. 5, 6, 9, and 12, having its lower end pivotally attached to an extension 68 of machine frame 30 by means of a pivot pin 69 and its upper end pivotally connected to one end of a link 70 by means of a pivot pin 71. The other end of link 70 is pivotally connected, FIG. 6, to the back of pan-dumping rack 62 by means of a pivot pin 72. A spring 73 normally holds the linkage and the rack 62 in the retracted position shown by full lines in FIG. 6 and serves to return the same from the extended, pan-dumping position shown by broken lines.

A camshaft 74 is rotatably mounted in frame extension 68 as an element in the drive system for actuating and timing both the dumping mechanism 23 and the grouping and crowding mechanism represented by contractible grouper frame 27.

Drive motor 35 is provided with an output drive shaft 75 which projects from both ends of the motor. Chain and sprocket drive set 36 is driven from one end of shaft 75 and a chain and sprocket drive set 76 connects the other end of shaft 75 in drive relationship with speed reduction gear box 77. Another chain and sprocket drive set 78 connects gear box 77 in drive relationship with cam shaft 74.

A cam 79, FIGS. 6 and 9, is fixed on shaft 74 to rotate therewith. It has a raised cam projection 80 for engaging a roller 81 which is mounted on lever 67. Cam 79 is so positioned and cam projection 80 is so arranged that, during the rotation of camshaft and cam, roller 81 moves lever 67 against the force of spring 73 to bring rack 64 to the pan-dumping position shown by broken lines in FIG. 6 as conveyor belt portion 25 is raised into a roll-retaining position. Immediately thereafter, continued rotation of camshaft and cam permits spring 73 to return the pan-dumping mechanism to pan-receiving position before belt portion 25 is lowered, before conveyor belt motion is resumed, and before feed of pans 22 to rack 62 is resumed.

Since the rolls must be crowded together during each machine cycle after they have been dumped from a pan and while belt portion 25 is held in raised position, grouper frame 27 is contracted as soon as possible after the rolls are deposited on the receiving surface of the conveyor belt. In providing mechanism to accomplish this, it has been found advantageous to mount an actuating cam 82, FIGS. 6 and 9, for the grouping and crowding mechanism on the same cam shaft 74 that mounts actuating cam 79 for the pan dumping mechanism 24.

Cam 82 is provided with a channel 83 which receives roller 84 of a drive lever 85. Lever 67's pivot pin 69 is conveniently used to also pivotally mount lever 85. Channel 83 follows the contour of cam 82, and, during rotation of such cam, the ascending portion of the inner wall thereof acts on roller 84 to move lever 85 for contracting grouper frame 27. The outer wall of channel 83 then comes into use and acts on roller 84 to return lever 85 and thereby return such grouper frame to its normal, expanded condition. Lever 85 acts to contract and expand the grouper frame by means of a system of rockshafts, throwarms and levers.

It is important that cam 82 be so shaped and so positioned on cam shaft 74 that the crowding of rolls in each machine cycle is completed while conveyor belt portion 25 is raised and expansion of the grouper frame begins just before or at the time belt portion 25 begins to lower.

Figures 10, 11:
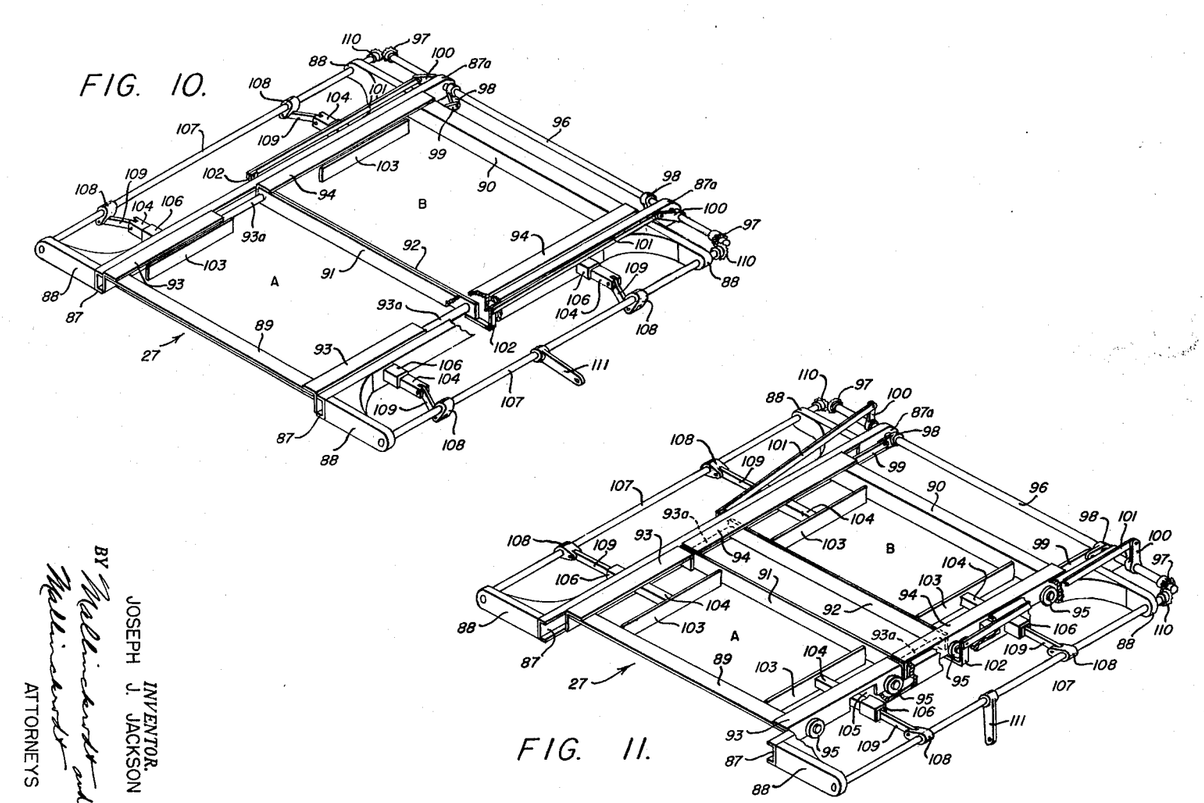
FIG. 10, a perspective view of the grouping and crowding mechanism in its normal, roll-receiving position, a portion of the contractible grouper frame being broken out to reveal details of the pushers.
FIG. 11, a corresponding view, but showing the mechanism in its crowding position and other portions of the contractible grouper frame broken out.

Grouper frame 27, FIGS. 10 and 11, comprises a pair of longitudinal frame members 87 rigidly attached, as by welding, to the underside of stationary frame 66 in mutually spaced relationship. These members 87 are advantageously formed from structural channels and extend somewhat beyond the overall length of the frame, as at 87a, to provide for rotatably mounting certain frame-operating mechanism. As illustrated, the projecting portions 87a are desirably finished off by welding web plates across the flanges in order to provide bearing support for such mechanism.

Projecting outwardly from rigid securement to the frame members 87 are respective sets of bracket members 88, which provide bearing support for other rotatable frame-operating mechanism.

Movable between and longitudinally along frame members 87 are end frame members 89 and 90 and divider members 91 and 92 parallel therewith. The latter divide the interior of frame 27 into the two compartments A and B.

Figure 2:
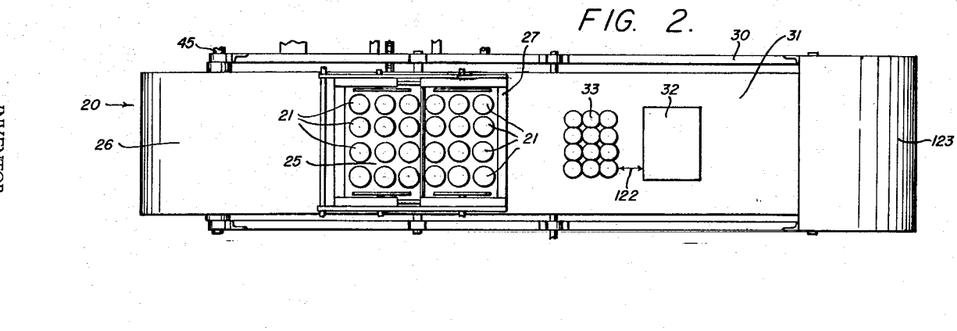
FIG. 2, a corresponding top plan, other portions of the machine having been broken away for convenience of illustration.

As stated hereinbefore, frame 27 is contractible for crowding together the mutually spaced rolls 21, FIG. 2, as they come from the baking pans 22, into the compact groups 33 ready for boxing. To this end, divider member 92 and frame end member 89 are rigidly joined together at their ends by means of respective, foreshortened sub-frame members 93 and rigid, rod-like extensions 93a thereof to form a rigid sub-frame, while divider member 91 and frame end member 90 are rigidly joined together at their ends by means of respective, sub-frame members 94 to form a second rigid sub-frame.

The rod-like extensions 93a of the first sub-frame extend through respective receiving apertures provided in divider member 91, so that the two sub-frames are loosely coupled together for mutual sliding movement toward and away from each other, the pair of extensions 93a and the divider member 91 sliding upon and relative to each other during such movement. As can be seen by comparing FIGS. 10 and 11 with each other, sliding movement of such sub-frames toward each other contracts the two compartments A and B of frame 27 sidewise, while the reverse sliding movement expands such contracted compartments to their original widths.

The sub-frames are movably mounted in the overall grouper frame 27 by means of rollers 95 rotatable on respective stub shafts which project from sub-frame members 93 and 94 into the channel recesses of longitudinal frame members 87. In this way, the rollers 95 are supported by and ride upon and along the flanges defining such channel recesses.

For operating the sub-frames to contract and expand the two compartments A and B sidewise in the manner previously explained, an elongate rockshaft 96 is journaled in the extensions 87a of longitudinal, main frame members 87. A pair of throwarms 98, fixed to rockshaft 96, is connected with main frame end member 90 by a pair of links 99, for moving the corresponding sub-frame back and forth when rockshaft 96 is rocked back and forth. A second pair of throwarms 100, fixed to rockshaft 96 in appropriate out-of-registry position relative to the first, is connected with main frame divider member 92 by a pair of links 101 and a pair of brackets 102, for moving the other sub-frame back and forth relative to the first and simultaneously with the movement thereof. Also involved in the contraction of grouper frame 27, are paired pusher elements 103 disposed at the opposite ends, respectively, of the respective sub-frames. These are extended and retracted in synchronism with what may also be regarded as the extension and retraction, in the manner previously explained, of the two sub-frames relative to each other functioning as pusher elements.

Each of these pusher elements 103 is mounted at the end of a push rod 104, transversely of the length of such rod. The rod extends backwardly through an aperture 105 in the associated sub-frame member (either a member 93 or a member 94 as the case may be), through a receiving aperture in the longitudinal, main frame member 87 concerned, and finally, through a slideway 106 which projects rigidly outwardly from such main frame member in registry with the aperture for supporting and guiding the rod as it reciprocates therethrough. The aperture 105 is elongated to allow for the back and forth movement of the particular sub-frame concerned relative to the rod.

For operating the pusher elements 103 to contract and expand the two compartments A and B endwise, a pair of rockshafts 107 is journaled in the sets of bracket members 88. Pairs of throwarms 108 fixed on the respective rockshafts in opposing but similar positions are connected by pairs of links 109 to the push rods 104 for reciprocating such push rods and, therewith, the pusher elements 103 as such rockshafts are rocked back and forth.

Rockshaft 107 and rockshaft 96 are operated in unison from drive means in common by means of bevel gears 110. Lever 85 is conveniently employed as the drive means. For this purpose, it is articulatively connected, see FIGS. 6 and 9, with one of the rockshafts 107. Such rockshaft has an actuating arm 111 fixed thereto, and the upper end of lever 85 is connected therewith by means of a link 112. Thus, as cam 82 rotates and operates drive lever 85 by means of the roller 84, the rockshafts 107 and 96 will be motivated accordingly, to alternately extend and retract the sub-frame and pusher components of the roll-crowding mechanism for the purpose of alternately contracting the two compartments A and B of grouper frame 27 and returning them to their normal expanded condition.

Drive lever 85 is also conveniently employed to operate mechanism for ejecting empty pans 22 from the top of stationary frame 66 following dumping of the rolls into grouper frame 27. To this end, an ejector bar 113 is pivotally connected to the upper end of lever 85 by the same pivot pin 114 by which link 112 is connected thereto. As lever 85 moves forwardly to contract the grouper frame 27, ejector bar 113 is moved forwardly to push an empty pan 22, FIG. 9, from the stationary frame 66 onto one end of an endless conveyor 115 which projects perpendicularly from the main belt conveyor 20 and is advantageously supported, in part, by brace structure 116, FIG. 5, extending from machine frame 30.

As shown in FIG. 3, conveyor 115 advantageously comprises a pair of narrow, parallel belts 116 spaced apart by a distance less than the width of the pans 22 and carried by a pair of inboard, drive pulleys 117 and a pair of outboard, idler pulleys (not shown). The pulleys 117 are fixed on a drive shaft 118, which is driven continuously by a bevel gear drive connection 119, FIGS. 3 and 5, with the output shaft 120 of a belt and pulley set 121 powered from gear box 37.

The construction and arrangement of the various drive mechanisms described in detail hereinbefore are such that all the operations of the machine are carried out in properly timed relationship.

Figure 7:
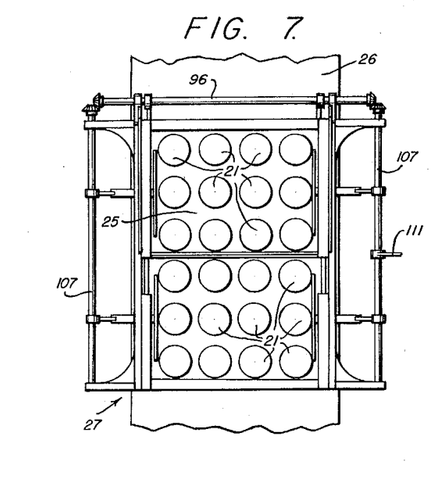
FIG. 7, a fragmentary portion of FIG. 2 showing the grouping and crowding mechanism drawn to the scale of FIG. 6.

Thus, pan-dumping mechanism 23 operates to deposit side-by-side, dozen roll groups from a standard size baking pan 22 in the compartments A and B, respectively, of grouper frame 27 when such grouper frame is in its normal, expanded condition, see FIGS. 2 and 7, and when elevator carriage 34 has raised the underlying portion 25 of conveyor belt 26 to or nearly to roll-receiving position, see FIG. 6.

Figure 8:
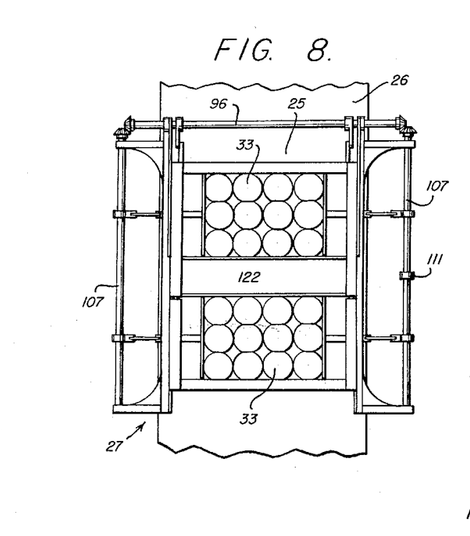
FIG. 8, a view corresponding to that of FIG. 7, but showing the mechanism at the completion of a grouping and crowding operation.

Thereafter, and while carriage 34 is still raised, drive lever 85 simultaneously operates the pusher elements 103 and the pusher subframes of grouper frame 27, see FIG. 11, to crowd the loosely grouped and confined rolls 21 in compartments A and B into two compact groups 33, FIG. 8, which are spaced apart from each other by a distance 122, see also FIGS. 1 and 2, providing ample work space between the two. At the same time, the empty pan 22 is pushed onto removal conveyor 115 by ejector bar 113.

Upon or during the return of grouper frame 27 to its normal, expanded condition of FIG. 10, elevator carriage 34 lowers belt portion 25 and the two compact groups 33 of rolls thereon, so that such rolls are below the level of the bottom of the grouper frame.

This all takes place in the time interval afforded by the "Geneva" type, continuous-to-intermittent, motion transmitting mechanism 40, FIG. 1, when belt conveyor 20 is stationary. The next period of travel of conveyor belt 26 moves the compact groups 33 of rolls from below grouper frame 27 to boxing station 31. During this time, pan feeding mechaninm 59, FIG. 1, transfers a fresh pan of rolls to dump rack 62 from the reserve supply on holding rack 24.

These pan dumping, roll crowding, and pan and roll removing operations are repeated cyclically as the machine continues to operate.

As the boxed, compact groups of rolls shown at 32, FIG. 1, reach idler pulley 29 at the tail end of belt conveyor 20, they enter a chute 123, which is curved about such pulley 29 in spaced relation to belt 26. Here they are inverted to upright condition, and are discharged, for example, onto a belt conveyor 124 where they travel to the head end of the machine for transfer, manually or otherwise, to a suitable storage rack or to a packaging machine for the application of protective wrap.

It has been convenient to explain the invention in connection with the specific machine for which it was conceived. Nevertheless, it will be quite apparent to those skilled in the mechanical arts that the inventive concepts involved afford considerable latitude in structural form and in use. Thus, it should be realized that the invention is concerned, in its broader aspects, with providing a machine for crowding together, in groups and on a supporting surface, individual articles deposited on such surface, and for periodically removing the groups of crowded articles so additional articles may be repeatedly deposited and grouped and crowded.

For this purpose, the machine comprises means for depositing a plurality of articles on a substantially horizontal support within contractible, article-confining means arranged to crowd the articles together into one or more compact groups. Means are provided for vertically separating the article-confining means and the support, preferably by lowering the latter relative to the former. Means are also provided for moving the support into and out of article-receiving position below the article-confining means. In addition means are provided for motivating the several means in predetermined, timed sequence so that the operations are carried out in appropriate sequence.

Whereas there is here illustrated and described a certain preferred construction which I presently regard as the best mode of carrying out my invention, it should be understood that various changes may be made without departing from the disclosed inventive subject matter particularly pointed out and distinctly claimed herebelow.

I claim:

1. A machine for crowding together multiple articles, comprising supporting means presenting a substantially horizontal and horizontally movable, receiving surface; means for depositing a plurality of articles on said surface in mutually spaced formation; contractible, article-confining means at the article-depositing location for crowding said articles together into mutually contiguous relationship on said surface, said surface being normally at article-clearance level below said article-confining means, and said article-confining means being normally in expanded, article-receiving condition; means for raising and lowering said surface to and from article-crowding position; means for horizontally moving said surface into and out of article-receiving position below said article-confining means; means for contracting and expanding said article-confining means; and means for motivating the several said means in predetermined, timed sequence so that said receiving surface of the supporting means moves into its article-receiving position, said raising and lowering means raises said receiving surface into article-crowding position, said depositing means deposits a plurality of articles on said receiving surface, said article-confining means contracts to crowd said articles together into mutually contiguous relationship, said article-confining means thereafter expands to normal article-receiving position, said raising and lowering means lowers said receiving surface to article-clearance level, and said receiving surface moves horizontally to remove the crowded articles out of article-receiving position.

2. The machine of claim 1, wherein the supporting means is a belt conveyor presenting an endless belt surface which sequentially provides said receiving surface as the conveyor belt moves through successive cycles of operation of the machine; and wherein said means for moving the receiving surface into and out of article-receiving position comprises drive means for said conveyor.

3. The machine of claim 2, wherein said belt conveyor is free and unencumbered at a location in its travel adjacent said article confining means to provide a boxing station where the crowded articles can be boxed; and wherein said drive means provides for movement of said article-receiving surface from article receiving position to said boxing station during each successive cycle of operation of the machine.

4. The machine of claim 2, wherein said drive means for the conveyor comprises mechanism for converting continuous motion to intermittent motion, said mechanism having its output connected in drive relationship with said conveyor; and means for continuously driving said mechanism.

5. The machine of claim 4, wherein said mechanism for converting continuous motion to intermittent motion is a "Geneva" movement having a continuously driven input member and having an intermittently driven output member.

6. The machine of claim 1, wherein the articles are contained in pans; and the means for depositing a plurality of articles on said surface includes a rack for receiving said pans, said rack having a pan-dumping section; and means for feeding pans in the rack to the pan dumping section, said pan feeding means being connected to said mechanism in driven relationship therewith for intermittently feeding pans in synchronism with the intermittent movement of said belt conveyor.

7. The machine of claim 6, wherein the pan feeding means includes a chain and sprocket feed set mounted on said rack; lugs secured to and serially spaced along the chain of said feed set for engaging said pans; and drive means, including a chain and sprocket drive set, for interconnecting said feed set in driven relationship with the output of the motion converting mechanism.

8. The machine of claim 6, wherein the depositing means further includes means for dumping and returning said pan-dumping section of the rack, and drive means therefor interconnected in driven relationship with said means for continuously driving said motion converting mechanism.

9. The machine of claim 8, wherein the depositing means for dumping and returning said pan-dumping section of the rack includes means pivotally mounting said pan-dumping section in the machine, linkage means pivotally mounted in the machine and pivotally connected to said pan-dumping section, cam means rotatably mounted in the machine, and resilient biasing means connected to said linkage means for continuously urging the same into contact with said cam means; and wherein the drive means for the pan-dumping section includes a chain and sprocket drive set in driven relation with the conveyor drive means for continuously rotating said cam means during operation of the machine, said cam means being arranged for actuating said linkage means to dump and return said pan-dumping section in each interval between the intermittent feeding of pans.

10. The machine of claim 2, wherein the means for raising and lowering said surface comprises an elevator carriage mounted directly and immediately below that portion of the conveyor belt which underlies the article-confining means, for alternately lifting and lowering said portion; means mounting said carriage for said lifting and lowering; and actuating means for lifting and lowering said carriage.

11. The machine of claim 10, wherein the actuating means comprises cam means rotatably mounted below and in engagement with the elevator carriage; and positive drive means rotatably connecting said cam means with a continuous drive component of the drive means for the conveyor.

12. The machine of claim 1, wherein the articles are contained in pans; there are additionally provided a rack for holding said pans, the means for depositing the articles on the receiving surface of the supporting means comprising a pan-dumping section of said rack and means for dumping said section relative to the article-confining means and for returning said section; means for feeding pans from the pan-holding portion of said rack to said section; and means adjacent the top of said article-confining means for removing a dumped pan following the pan-dumping operation.

13. The machine of claim 12, wherein the pan-removal means comprises pan-ejector mechanism, including a pivotally mounted drive lever; and cam means rotatably mounted in driven relationship with the motivating means; said cam means being arranged to drive said lever back and forth.

14. The machine of claim 13, wherein linkage means are provided between the article-confining means and the drive lever, for contracting the former to crowd the deposited articles together as a pan is ejected and for reexpanding said article-confining means with return of said pan ejector mechanism.

15. The machine of claim 1, wherein the article-confining means for crowding together the deposited articles comprises a grouper frame made up of a pair of supporting guides arranged in mutually spaced and parallel, side by side relationship; a pair of sub-frames loosely coupled together so that each is slidable relative to and partially within the other as a pusher, said sub-frames being normally retracted to fully open condition but adapted when extended toward and within each other to crowd said deposited articles together into two mutually spaced groups; means mounting said sub-frames in and between the supporting guides, for executing their sliding movement back and forth along and relative to said guides; elongate pusher elements within each of the sub-frames at respectively opposite ends thereof and parallel to said guides; and reciprocatory, normally retracted, mounting means for said pusher elements; and wherein the means for expanding and retracting said article-confining means comprise actuating means for extending and retracting said sub-frames and actuating means for extending and retracting said pusher elements in synchronism with said sub-frames.

16. The machine of claim 15, wherein the mounting means for the pusher elements are respective bars which extend outwardly of the grouper frame through the corresponding sub-frame members and the supporting guides, said sub-frame members being apertured to receive said mounting means and to accommodate sub-frame movement relative thereto.

17. The machine of claim 15, wherein the actuating means comprises rockshafts geared to work in synchronism; throwarms fixed on the respective rockshafts; linkage connecting the respective throwarms with the sub-frames and with the pusher elements; an actuating throwarm fixed on one of the rockshafts; a drive lever; and linkage connecting the drive lever with the actuating throwarm, said drive lever being connected in drive relationship with the motivating means.

18. The machine of claim 1, wherein the article confining means includes multiple pusher members, each defining a side of an article confining space; and means for alternately moving said pusher members inwardly of said space to a contracted position and outwardly of said space to an expanded position.

19. The machine of claim 1, wherein the means for motivating the several said means in predetermined, timed sequence includes, a drive motor, first drive means connecting the drive motor to the movable supporting means for moving the receiving surface thereof into and out of article-receiving position; a mechanism for converting continuous motion to intermittent motion operatively interposed in said first drive means; cam means arranged as a timing drive for the surface raising and lowering means; second drive means connecting the drive motor with the cam means; third drive means connecting the drive motor with the article-confining means; and fourth drive means connecting the drive motor with the article-depositing means.

20. The machine of claim 1, wherein said articles comprise items baked in multiple; said supporting means comprises a belt conveyor; a rack is provided for loaded baking pans; said means for depositing a plurality of articles comprises a pan-dumping mechanism for emptying the baking pans onto the belt of said conveyor; means are provided to move said loaded pans individually to said pan-dumping mechanism; and said means for raising and lowering said belt conveyor comprises an elevator carriage.

21. The machine of claim 1, wherein said articles comprise items baked in multiple; said supporting means comprises a conveyor; a rack is provided for loaded baking pans; and said means for dumping a plurality of articles comprises a pan-dumping mechanism constructed for dumping the baking pans onto the conveyor.

22. A machine for crowding together multiple articles, comprising supporting means presenting a substantially horizontal receiving surface; means for depositing a plurality of articles on said surface in mutually spaced formation; contractible, article-confining means at the article-depositing location for crowding said articles together into mutually contiguous relationship on said surface, said article-confining means being normally in expanded, article-receiving condition; means for raising and lowering said supporting means with respect to said article-confining means so that its said receiving surface is moved into and out of article-crowding position; means for removing the crowded articles from below said article-confining means; and means for motivating the several said means in predetermined, timed sequence.

23. Grouping and crowding mechanism, comprising a grouper frame made up of a pair of supporting guides arranged in mutually spaced and parallel, side by side relationship; a pair of sub-frames loosely coupled together so that each is slidable relative to and within the other as a pusher, said sub-frames being normally retracted to fuly open condition but adapted when extended toward and within each other to crowd said deposited articles together into two mutually spaced groups; means mounting said sub-frames in and between the supporting guides, for executing their sliding movement back and forth along and relative to said guides; elongate pusher elements within each of the sub-frames at respectively opposite ends thereof and parallel to said guides; reciprocatory, normally retracted, mounting means for said pusher elements; and actuating means for extending and retracting said sub-frames and for extending and retracting said pusher elements in synchronism.

24. The mechanism of claim 23, wherein the mounting means for the pusher elements are respective bars which extend outwardly of the grouper frame through the corresponding sub-frame members and the supporting guides, said sub-frame members being apertured to receive said mounting means and to accommodate sub-frame movement relative thereto.

25. The mechanism of claim 23, wherein the actuating means comprises rockshafts geared to work in synchronism; throwarms fixed on the respective rockshafts; linkage connecting the respective throwarms with the sub-frames and with the pusher elements; an actuating throwarm fixed on one of the rockshafts; a drive lever; and linkage connecting the drive lever with the actuating throwarm, said drive lever being connected in drive relationship with the motivating means.

References Cited in the file of this patent

UNITED STATES PATENTS

| | | |
|---|---|---|
| 2,184,290 | Dodge | Dec. 26, 1939 |
| 2,365,007 | Rideout et al. | Dec. 12, 1944 |
| 2,751,059 | Klein et al. | June 19, 1956 |
| 2,805,755 | Jones | Sept. 10, 1957 |
| 2,808,951 | Kernen | Oct. 8, 1957 |
| 2,962,848 | Wilson | Dec. 6, 1960 |